United States Patent [19]

Parker

[11] Patent Number: 5,786,754
[45] Date of Patent: Jul. 28, 1998

[54] METHOD AND APPARATUS FOR ELECTRONICALLY CANCELLING A VEHICLE DIRECTION SIGNAL IN AN ELECTRIC ASSIST STEERING SYSTEM

[75] Inventor: Stuart Parker, Manhattan Beach, Calif.

[73] Assignee: TRW Inc., Lyndhurst, Ohio

[21] Appl. No.: 572,176

[22] Filed: Dec. 13, 1995

[51] Int. Cl.[6] ................................................. B60Q 1/00
[52] U.S. Cl. .......................... 340/476; 340/475; 340/478; 180/401
[58] Field of Search ................................ 340/476, 477, 340/465, 478, 475; 200/61.27, 61.3; 364/424.05; 180/401, 167

[56] References Cited

U.S. PATENT DOCUMENTS

| | | | |
|---|---|---|---|
| 3,110,011 | 11/1963 | Burson, Jr. | 57/321 |
| 3,555,507 | 1/1971 | Burson, Jr. | 340/477 |
| 3,914,737 | 10/1975 | Sato | 340/476 |
| 3,924,163 | 12/1975 | Reinertson et al. | 361/191 |
| 4,213,116 | 7/1980 | Holtzman et al. | 340/476 |
| 4,384,270 | 5/1983 | Morita et al. | 340/476 |
| 4,403,211 | 9/1983 | Shibata et al. | 340/476 |
| 4,556,862 | 12/1985 | Meinershagen | 340/478 |
| 4,638,290 | 1/1987 | Wagner | 340/476 |
| 4,638,295 | 1/1987 | Middlebrook et al. | 340/465 |
| 4,644,318 | 2/1987 | Miyamaru et al. | 340/476 |
| 4,660,020 | 4/1987 | Behr et al. | 340/477 |
| 4,792,785 | 12/1988 | Miyamaru Yukio et al. | 340/476 |
| 4,794,536 | 12/1988 | Eto et al. | 364/424.05 |
| 4,962,366 | 10/1990 | Hatanaka et al. | 340/476 |
| 5,198,798 | 3/1993 | Lietzow et al. | 340/539 |
| 5,257,828 | 11/1993 | Miller et al. | 180/79.1 |
| 5,260,685 | 11/1993 | Parker | 340/477 |
| 5,283,740 | 2/1994 | Sato et al. | 364/424.05 |

*Primary Examiner*—Jeffery Hofsass
*Assistant Examiner*—Davetta Woods
*Attorney, Agent, or Firm*—Tarolli, Sundheim, Covell, Tummino & Szabo

[57] ABSTRACT

An electric assist steering system (10) includes a steering torque sensor (110) and an electric assist variable reluctance motor (26) operatively connected to a steering member. A motor control signal is provided in response to a value of the torque signal for control of the assist motor (26). Energization sequence of the assist motor is dependant upon the relative position of the motor rotor (38) with respect to the motor housing and stator (32). A motor position sensor (54) provides a rotor position signal to (i) a drive control circuit (150) controlling motor energization sequence, and (ii) turn signal control function (130). Turn signal control function (130) controls turn signal indicators (121) in response to the sensed motor position.

6 Claims, 8 Drawing Sheets

METHOD AND APPARATUS FOR ELECTRONICALLY CANCELLING A VEHICLE DIRECTION SIGNAL IN AN ELECTRIC ASSIST STEERING SYSTEM

TECHNICAL FIELD

The present invention is directed to a power assist steering system and is particularly directed to a method and apparatus for electronically cancelling a vehicle direction signal in a vehicle having an electric assist steering system.

BACKGROUND OF THE INVENTION

There are many known power assist steering systems for automotive vehicles. Some provide steering assist by using hydraulic power and others by using electric power.

Electric power assist steering systems that utilize a rack and pinion gear set provide power assist by using an electric motor to either (i) apply rotary force to a steering input shaft connected to a pinion gear, or (ii) apply linear force to a steering member having rack teeth thereon.

The electric motor in such systems is typically controlled in response to (i) a driver's applied torque to the vehicle steering wheel, and (ii) sensed vehicle speed. The position of the motor rotor relative to the motor stator is used in controlling commutation of a variable reluctance motor in an electric power assist steering system. One such system is disclosed in U.S. Pat. No. 5,257,828 to Miller et al. The required motor torque and sequence of energization of stator poles is dependant upon (i) the applied steering torque, and (ii) the present position of the rotor relative to the stator.

Vehicle turn indicators typically are mechanically actuated and cancelled. Some electronically cancelling turn indicators cancel after specified time periods. Other electronically cancelling turn indicators have mechanical contacts on conductive strips to cancel indicator signals.

SUMMARY OF THE INVENTION

The present invention provides an electronically cancelling turn signal utilizing a motor position sensor of a variable reluctance motor in the electric assist steering system.

In accordance with the present invention, an apparatus is provided for electronically cancelling a directional signal for use in a vehicle. The apparatus comprises a turn signal selection means for providing a signal indicative of a selected turning direction. A turn signal indicating means for indicating a selected turning direction. An electric assist motor for, when energized, providing power assist steering. A motor position sensing means for sensing position of said electric assist motor and for providing a motor position signal indicative thereof. Control means is connected to the turn signal selection means, the turn signal indicating means, and the motor position sensing means for controlling the turn signal indicating means in response to sensed motor position.

In accordance with another aspect of the present invention, a method is provided for cancelling a directional signal for a vehicle. The method comprises the steps of selecting a turning direction and providing a signal indicative of the selected turning direction. Providing an electric assist motor for, when energized, providing power assist steering. The method further includes controlling the turn signal indicating means in response to sensed motor position.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF PREFERRED EMBODIMENTS

Figure 1:
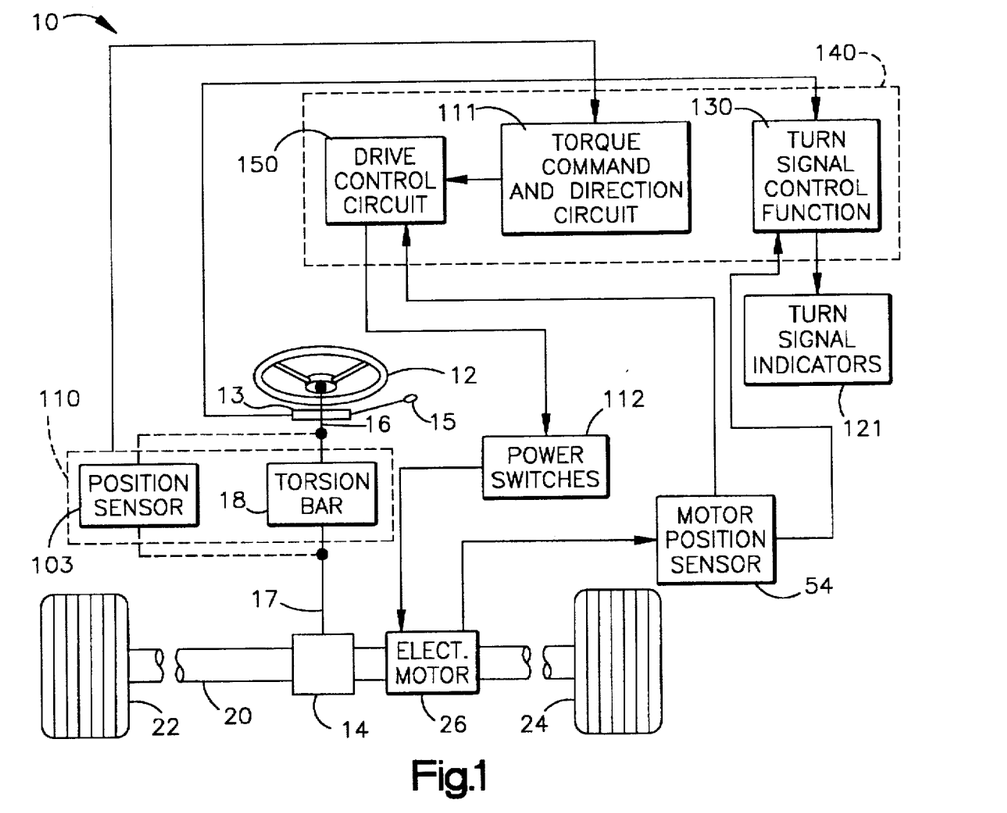
FIG. 1 is a schematic block diagram illustrating a power assist steering system made in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to a pinion shaft 17. The input shaft 16 is operatively coupled to the pinion shaft 17 through a torsion bar 18. The torsion bar 18 twists in response to applied steering torque thereby permitting relative rotation between the input shaft 16 and the pinion shaft 17. Stops of a type well known in the art limit the amount of such relative rotation between the input and pinion shafts.

A turn signal selection switch 13 is mounted in the steering column near steering wheel 12 in a known manner. Switch lever 15 is operatively connected to turn signal selection switch 13. Turn signal selection switch 13 is spring loaded to center and may be either a momentary switch or one with a detent at the end positions. Selection switch 13 provides a signal indicative of a desired turning direction when switch lever 15 is moved in an upward (right turn) or downward (left turn) direction. A mechanical detent to retain the switch in the desired turning direction position once the selection switch signal is actuated is not required. An electronically controlled detent having a solenoid actuator may be used if desired rather than a mechanical detent.

Since mechanical coupling between turn signal selection switch 13 and input shaft 16 is not required, any number of switch types may be used in place of switch lever 15 and turn signal selection switch 13. For example, push button switches located on the steering wheel or dash board may be used.

The output of turn signal selection switch 13 is connected to a turn signal control function 130 in a controller 140. The controller 140 is preferably a microprocessor or microcomputer. The output of turn signal control function 130 is connected to turn signal indicators 121. The turn signal indicators 121 include lights, both inside and outside the passenger compartment, for indicating a turning direction to the vehicle operator and drivers in other vehicles.

The pinion gear 14 has helical teeth which are meshingly engaged with straight cut teeth on a rack or linear steering member 20. The pinion gear in combination with the straight cut gear teeth on the rack member form a rack and pinion gear set. The rack is steerably coupled to the vehicle's steerable wheels 22, 24 with steering linkage in a known manner. When the steering wheel 12 is turned, the rack and pinion gear set converts the rotary motion of the steering wheel into linear motion of the rack. When the rack moves linearly, the steerable wheels 22, 24 pivot about their associated steering axis and the vehicle is steered.

An electric assist motor 26 is drivingly connected to the rack 20. When the electric motor 26 is energized, it provides power assist so as to aid in the rotation of the vehicle steering wheel by the vehicle operator. In accordance with the present invention, the electric assist motor is a variable reluctance motor. A variable reluctance motor is desirable for use in an electric assist steering system because of its small size, low friction, and its high torque-to-inertia ratio.

Figure 2:
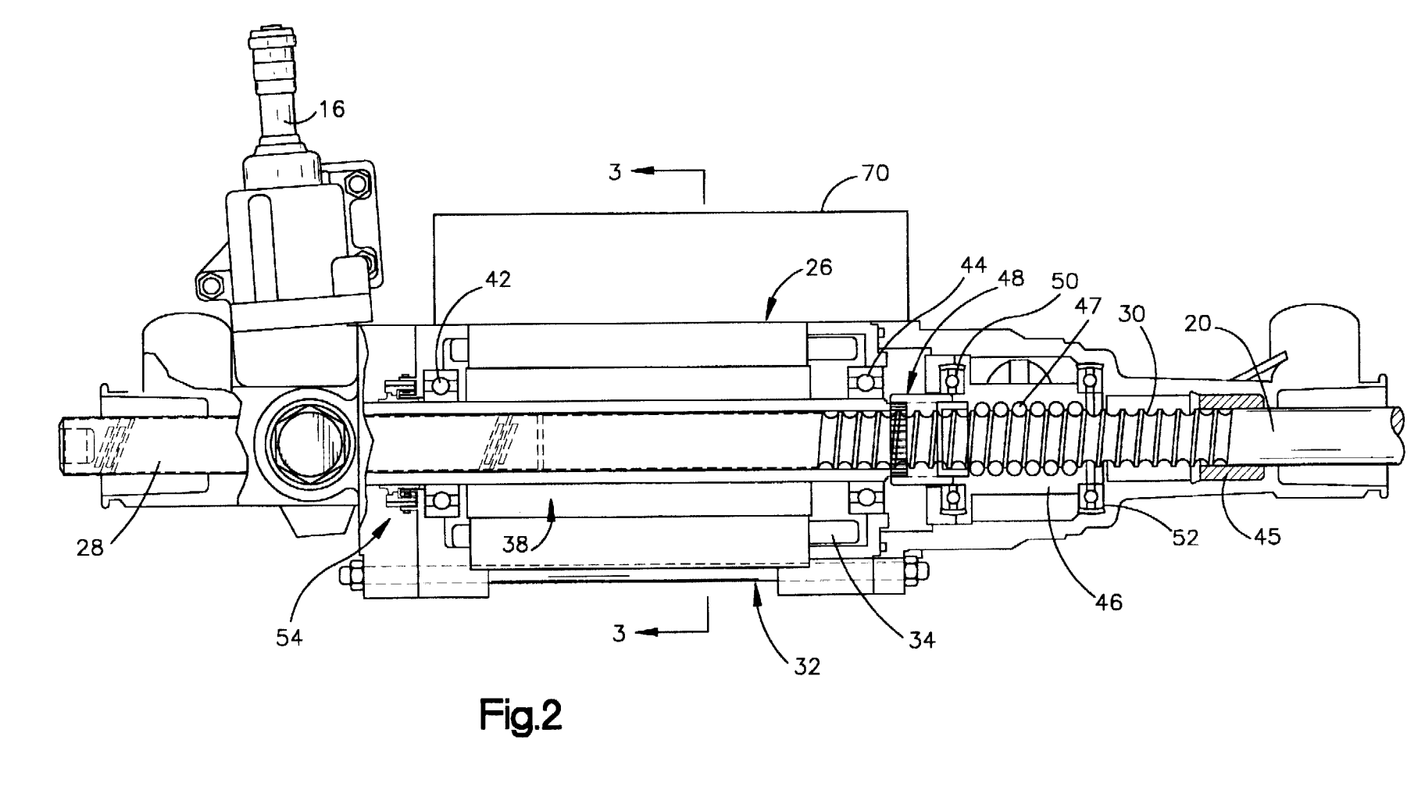
FIG. 2 is a plan view partially in section of a portion of the power assist steering system of FIG. 1.
Figure 3:
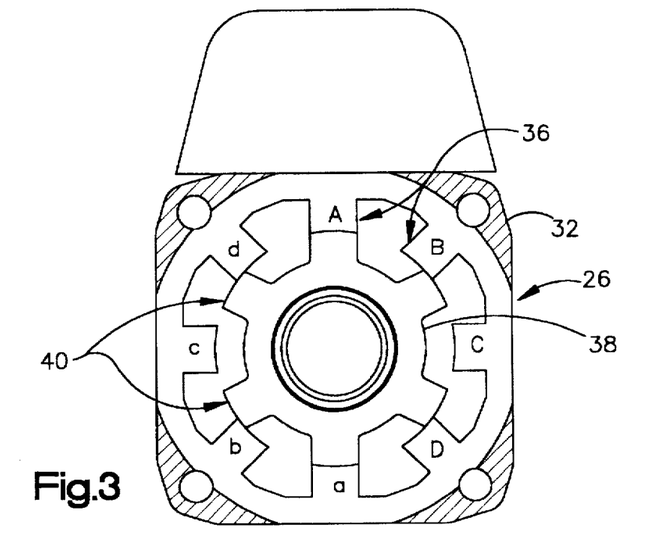
FIG. 3 is a cross section view as seen from the line 3—3 of FIG. 2.

Referring to FIGS. 2 and 3, the rack 20 has a straight rack tooth portion 28 in meshing engagement with the pinion gear 14. The rack 20 also has a threaded convolution portion 30. The variable reluctance motor 26 circumscribes the rack 20 and is mounted in a motor housing 32, a portion of which forms the motor stator. The motor 26 includes a plurality of stator windings 34 (FIG. 2), each one wrapped about its associated stator pole 36 (FIG. 3). The motor 26 also includes a rotor 38 having a plurality of rotor poles 40. In a preferred embodiment of the present invention, the variable reluctance motor includes eight stator poles and six rotor poles. The stator poles are arranged so as to be energizes in pairs designated Aa, Bb, Cc, and Dd.

The operation of a variable reluctance motor and its principle of operation are well known in the art. Basically, the stator poles are energized in pairs. The rotor moves so as to minimize the reluctance between the stator poles and the rotor poles. Minimum reluctance occurs when a pair of rotor poles are aligned with the energized stator poles. Once minimum reluctance is achieved, i.e., when rotor poles align with a pair of energized stator coils, those energized stator coils are de-energized and an adjacent pair of stator coils are energized. The direction of motor rotation is controlled by the sequence in which the stator coils are energized. The torque produced by the motor is controlled by the current through the stator coils. U.S. Pat. No. 5,257,828, to Miller et al., and assigned to TRW Inc., which is hereby fully incorporated herein by reference, discloses a control arrangement for variable reluctance motor.

The motor 26 is mounted in the motor housing 32 and rotatably supports the rack 20 through bearings 42, 44. The rack is also supported by the pinion gear and bearing 45. The motor rotor is drivingly connected to a ball-nut drive arrangement 46 through a connection tube 48. The ball-nut drive arrangement 46 circumscribes the threaded convolution portion 30 of the rack 20 with the nut portion being operatively connected to the threaded convolution portion of the rack through a plurality of balls 47. Such an arrangement is fully described in U.S. Pat. No. 4,415,054, to Drutchas now U.S. Reissue Pat. No. 32,222, assigned to TRW Inc., which is hereby fully incorporated herein by reference.

When the motor is energized, the rotor turns which, in turn, rotates the nut portion of the ball-nut drive arrangement. When the nut rotates, the balls transfer a linear force to the rack. The direction of rack movement is dependent upon the direction of rotation of the motor. The nut 46 is rotatably supported in the housing 32 by thrust bearings 50, 52.

A motor position sensor 54 is operatively connected between the motor rotor and to the motor stator. The function of the motor position sensor 54 is to provide an electrical signal indicative of the position of the rotor relative to the stator. For proper operation of the variable reluctance motor, including direction of rotation and applied torque, it is necessary to know the position of the rotor relative to the stator.

In the preferred embodiment of the present invention, a physical rotor position sensor is provided. It is known in the art that the rotor position can be determined by means other than a physical position sensor. For example, it is possible to monitor the current through the de-energized stator coils and, based upon the sensed current, the rotor position is determined. One specific arrangement for sensing rotor position without a separate position sensor is disclosed in U.S. Pat. No. 5,072,166, which is hereby fully incorporated herein by reference.

Figure 4:
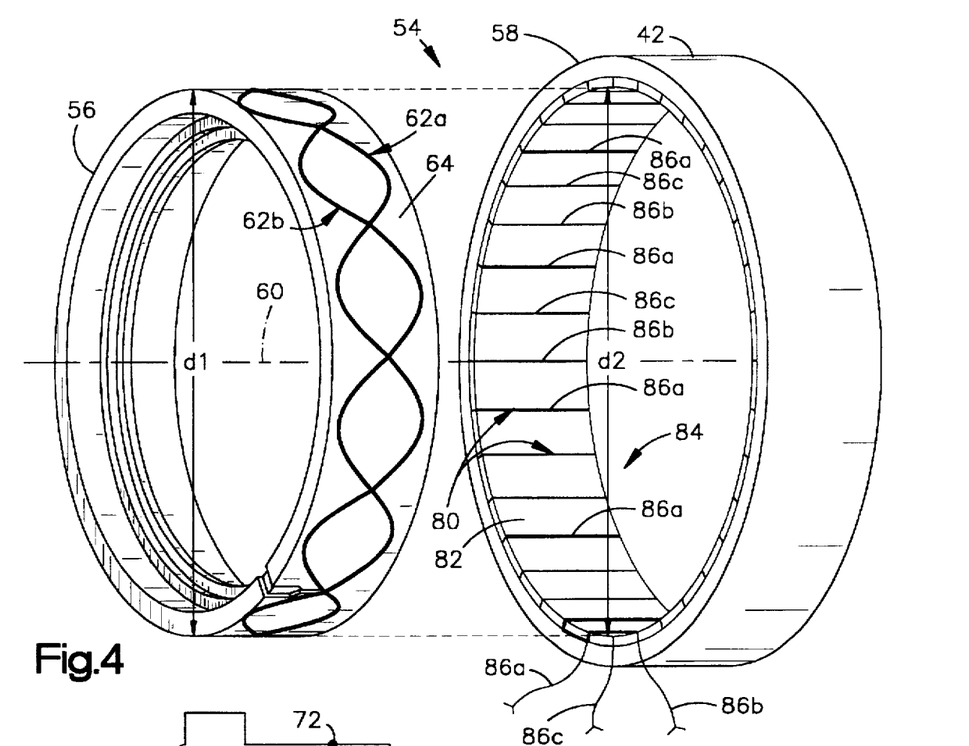
FIG. 4 is an isometric exploded view of the motor position sensor shown in FIG. 1.

Referring to FIGS. 4–8, the structure and operation of a preferred rotor position sensor 54 will be appreciated. The rotor position sensor 54 includes a transmitting ring 56 and a receiving ring 58. The rings shown in FIG. 4 are axially offset for clarity. In their assembled position, shown in FIG. 5, the rings are mounted so as to be concentric (nested) about a common axis 60. The rings 56, 58 are preferably made from a magnetically permeable material that will support magnetic flux in the 200 kHz frequency range. The permeability of such material preferably exceeds 10 at this frequency. Magnetically permeable materials that exhibit such characteristics include powdered iron, soft ferrites, and ferrite filled plastic. The magnetically permeable material provides a return path for the magnetic circuits associated with the transmitting and receiving rings. In addition, the magnetically permeable material provides filtering of EMF interference from outside sources, and even from the operation of the motor itself.

The transmitting ring 56 has an outer diameter d1. The receiving ring 58 has an inner diameter d2. The diameter d1 is less than the diameter d2 so that a relatively small air gap exists between the two rings when they are assembled in their concentric or nested arrangement.

The transmitting ring 56 is coaxially secured to the rotor 38. The transmitting ring 56 has two sinusoidal grooves 62a and 62b cut in its outer surface 64. The sinusoidal grooves 62a and 62b are 180 electrical degrees out of phase. The orientation of the grooves 62a and 62b are referred to as being a circumferentially varying sinusoidal pattern.

A transmitting coil 66 is disposed in the grooves 62a and 62b around the entire circumference of the ring 56. The transmitting coil 66 comprises two conductive electrical tracks 68a and 68b being disposed in the grooves 62a and 62b, respectively. The conductive electrical tracks 68a and 68b are electrically insulated from each other and from the ring 56. Preferably, the depth of the grooves 62a and 62b and the dimension of the conductors 68a and 68b are such that, once assembled, the conductors 68a and 68b are flush with the outer surface 64. Each conductive electrical track 68a and 68b is arranged in a circumferentially varying sinusoidal pattern, with a 180° relative offset between the two patterns. The sinusoidal patterns of the conductive electrical tracks 68a and 68b can be expressed by the following equations:

$$C_{68a} = D \sin(6\alpha) \quad (1)$$

$$C_{68b} = D \sin(6\alpha + 180) \quad (2)$$

where C equals the axial position of the pattern along a circumferential reference axis 70, D equals the peak value of the distance of the pattern from the circumferential reference axis 70, and $\alpha$ equals the mechanical angle in degrees. The number six is the spatial frequency of the patterns, with each pattern undergoing a 360° phase change every sixty mechanical degrees. The patterns repeat every sixty mechanical degrees, corresponding to the number of rotor poles 40 of the motor 26.

Figure 7A:
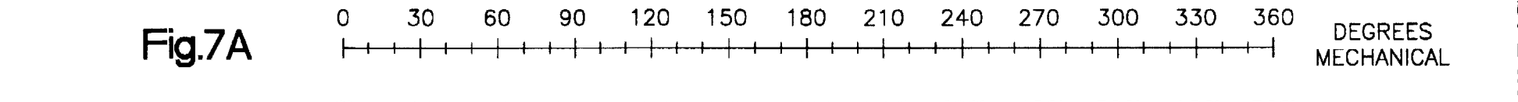
FIGS. 7A and 7B are scales showing the relationship of mechanical degrees of motor rotation and electrical degrees of motor rotation for the motor of FIG. 1.
Figures 7B, 7C, 7D, 7E, 7F:
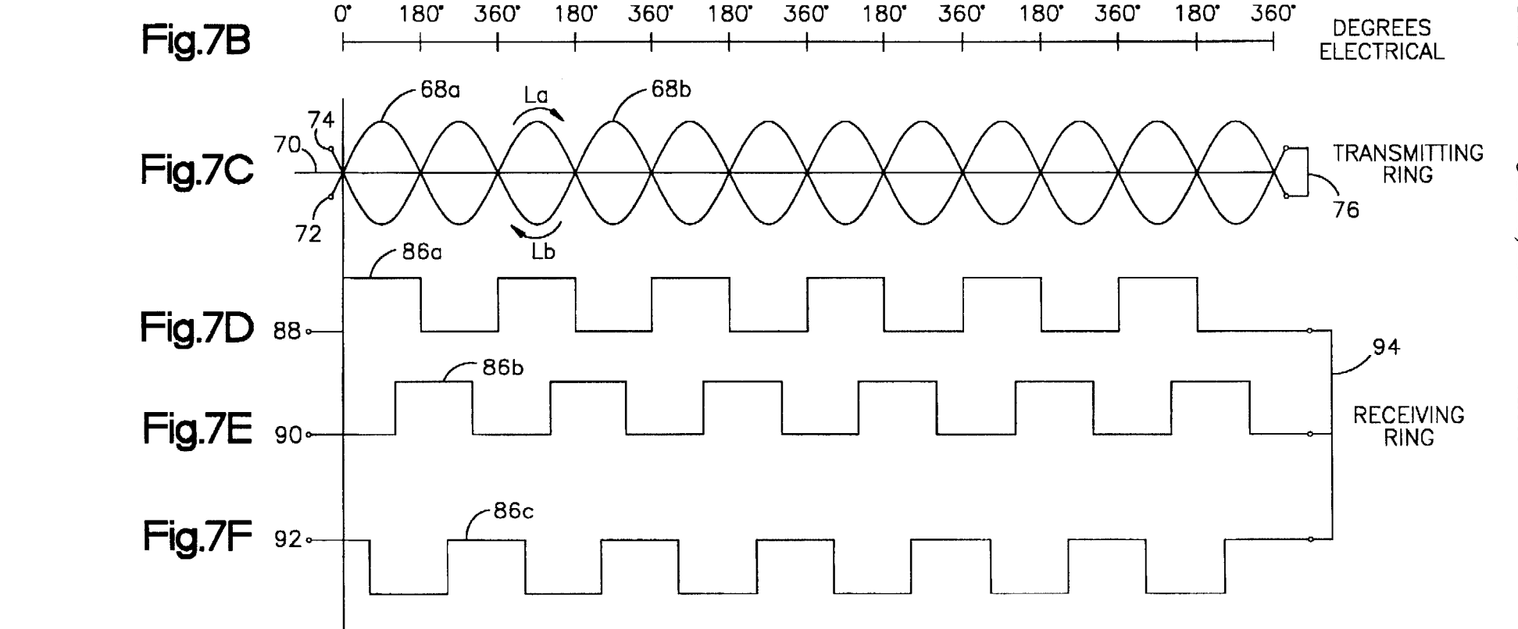
FIGS. 7C–7G of graphical representations of electrical signals present during one revolution of the position sensor of FIG. 4.

FIGS. 7A and 7B depict a scale of mechanical degrees of the ring 56 and a scale of electrical degrees of the ring 56, respectively. FIG. 7C illustrates the sinusoidal patterns of the conductive electrical tracks 68a and 68b. The two conductive electrical tracks 68a and 68b have first connection terminals 72 and 74, respectively. A common connection terminal 76 joins the other connection terminal of the tracks. As a result, the instantaneous current in conductive electrical track 68a is in a direction opposite to that in track 68b. The effect of the two circumferentially varying sinusoidal patterns is a well defined instantaneous magnetic flux pattern of alternating positive and negative potentials in the respective areas bounded by the two conductor patterns.

In accordance with one embodiment of the position sensor, the transmitting ring 56 is made from a powdered iron toroid. The two grooves 62a and 62b are machined in the outer surface 64 of the toroid to form the sinusoidal patterns previously described. A wire is laid in each of the grooves to form the conductive electrical tracks 68a and 68b. The grooves 62a and 62b are slightly tapered in an inward radial direction to hold the wires therein. In addition, an adhesive is applied to secure the wires in place. One of the groove depths is greater than the other to avoid pressure at the intersection points of the two wires. In this embodiment, it is desirable to keep the wires as close to the surface of the ring 56 as possible to assure a well-defined magnetic pattern is transmitted.

Figure 6:
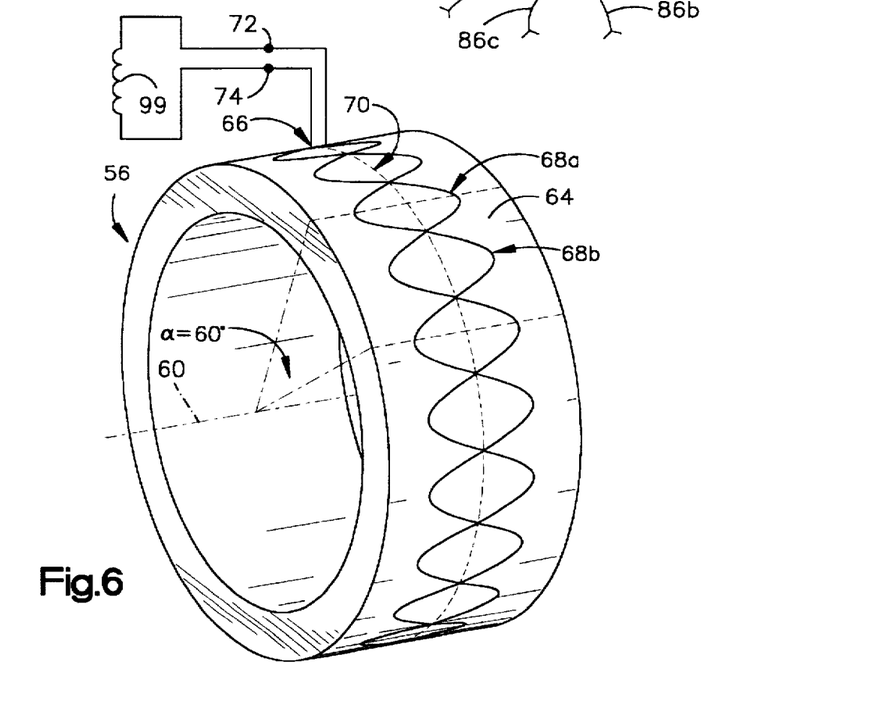
FIG. 6 is an isometric view of another embodiment portion of the position sensor shown in FIG. 4.

In accordance with an alternative embodiment of the position sensor, the transmitting ring 56 is made of a moldable soft ferrite material with a plurality of radially raised, foot-ball shaped, lands or bobbins. The radially raised bobbins form a border for sinusoidal patterns similar to the patterns described above. Each radially raised bobbin is referred to as a pole. An insulated wire is wound around the poles in a first direction, following a sine pattern, around the entire circumference of the ring. The insulated wire is then wound around the poles in the other direction following a 180° shifted sine pattern to the original starting terminal. The number of windings of the insulated wire may be repeated to yield an increased turns ratio. The outer diameter of the raised pole ring must be less than the inner diameter of a receiving ring to insure an air gap between the transmitting ring and the receiving ring.

There are several benefits that result from a raised pole design. First, the raised pole design allows for manufacture through low cost molding techniques, and is readily producible in large volumes. The raised poles also allow for the use of conventional winding techniques in mounting the wire on the transmitter ring thereby resulting in further cost advantages. Finally, the raised poles provide a magnetically focused field area and, therefore, improve the efficiency of the transmitting ring.

Figure 5:
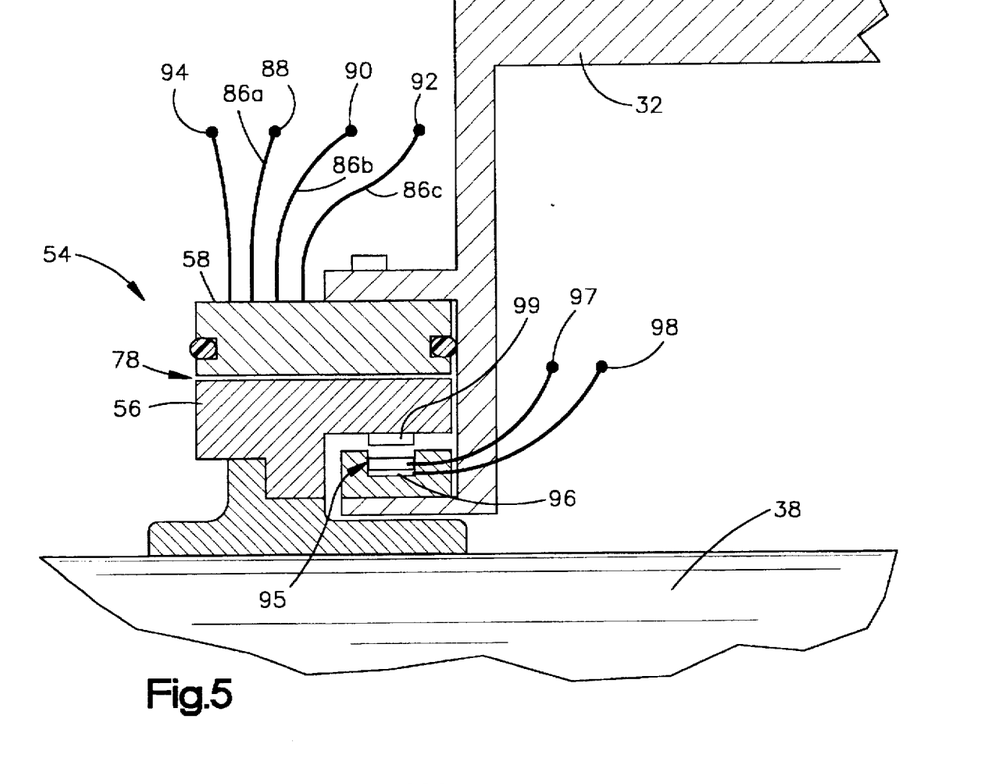
FIG. 5 is a side sectional view of a portion of the motor position sensor of FIG. 4.

The receiving ring 58 is mounted to the motor stator and, in turn, to the housing 32 in a coaxial relationship with the transmitting ring 56 so that the transmitting ring 56 is nested inside of the receiving ring 58. The radial proximity of the ring 56 and ring 58 provides electromagnetic coupling therebetween so as to form a rotary transformer 78.

The receiving ring 58 has a plurality of parallel conductive tracks 80 cut into its inner surface 82. A plurality of receiving coils 84 are wound in these tracks. Specifically, the receiving coils 84 comprise three sets of coils each of which are wound in associated tracks 86a, 86b, and 86c with each of the coils being insulated from one another and from the ring 58. The coils are also designated 86a, 86b, and 86c, respectively.

Each of the tracks 86a, 86b, and 86c is arranged in a circumferentially varying square wave pattern, separated from each of the other patterns by thirds so as to be offset by 120° electrical degrees (20° mechanical) from the other two patterns. Every sixty mechanical degrees, the patterns repeat.

Referring to FIGS. 7D, 7E, and 7F, the outputs of each of the coils in tracks 86a, 86b, and 86c are depicted. These coils form square wave patterns 86a, 86b, 86c, respectively. The coil in track 86a has a connection terminal 88. The coils in tracks 86b and 86c have, respectively, connection terminals 90 and 92. The coils in tracks 86a, 86b, and 86c have a common connection terminal 94.

The slots 80 are circumferentially narrow and radially shallow to assure a sharp delineation of the magnetic field transmitted by the transmitting ring 56. There are thirty-six circumferentially equidistant slots, that is, one slot every 10°. In a preferred embodiment, the coils in tracks 86a, 86b, and 86c are each made with wire positioned in the slots 80 with a wire being placed in every third slot. The wire for coil 86a is placed in one slot 86a, runs along the edge of ring 58 until it reaches the next slot 86a where it runs up that next slot. The wire 86a, in effect, forms a square wave pattern in slots 56a around the entire circumference of ring 58. The same is true for 86b and 86c in their associated slots. The wires in the slots relative to the transmitter windings is shown in FIGS. 7D–7F.

Figure 7G:
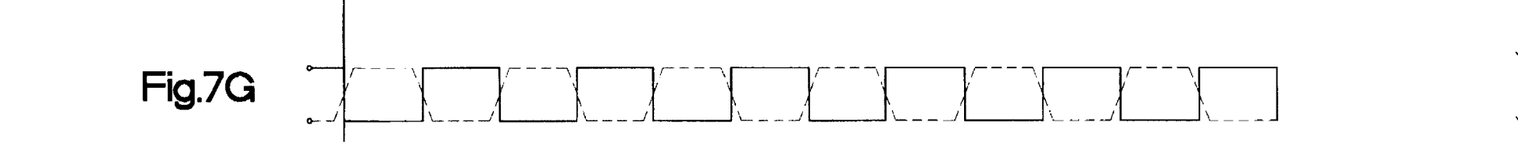

If a higher received signal strength is desired, the wire pattern shown in FIG. 7G can be used for each of the tracks. The dotted line corresponds to a return wire and effectively increases the turns ratio of the coil formed by the wire, thereby increasing the strength of the signal received by that coil.

Figure 8:
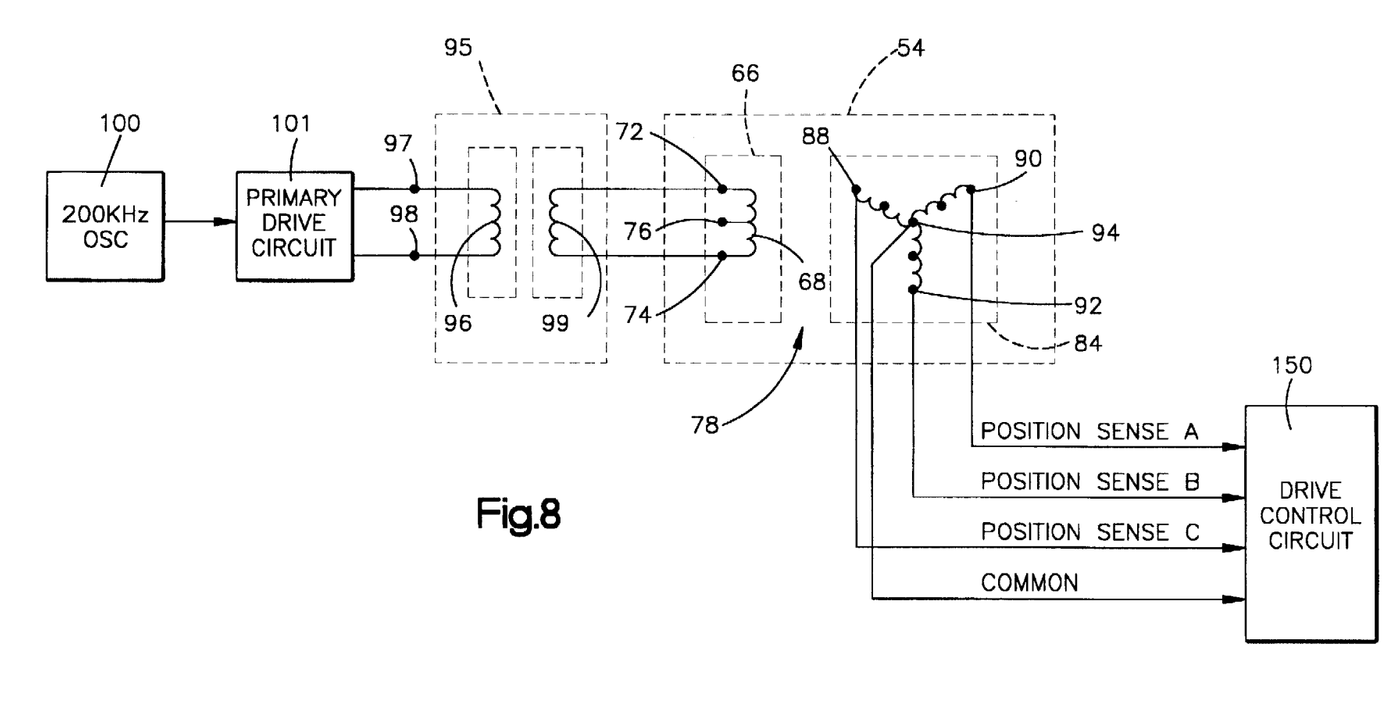
FIG. 8 is a schematic circuit diagram of the drive arrangement for the rotor position sensor of FIG. 4.

Referring to FIG. 5, the signal from the receiving coils 84 is accessible though stationary contacts 88, 90, 92 since the receiving ring 58 is secured to the stator. Since the transmitting ring 56 is secured to the rotor 38, the coil 68 is energized through a rotary transformer arrangement 95 (as shown in FIG. 8). A primary coil 96 is secured to the motor housing and stator 32 and is electrically connected through terminals 97, 98. A secondary coil 99 is secured to the rotor 38 and is electrically connected to the transmitting coil 68 through terminals 72, 74 (FIG. 6). The primary coil 96 and secondary coil 99 are in sufficiently close proximity to each other so as to form the rotary transformer 95.

Referring to FIG. 8, the primary coil 96 is electrically connected to a signal generator 100 through a primary drive circuit 101. The drive signal applied to the rotary transformer 95 is a sinusoidal drive signal. The receiving coil 99 outputs a sinusoidal signal in response to the electromagnetic field transmitted by the transmitting coil 96. The transmitting coil 68 of the transmitting ring 56 is, in turn, driven with the 200 kHz sinusoidal drive signal. The receiving coils 84 each output a sinusoidal signal. The sinusoidal signals from the receiving coils 84 are offset from each other by 120 electrical degrees. The output signal from the receiving coils can be expressed as:

$$V1 = v\ \sin(\omega t)\sin(\theta_E + 0) \quad (3)$$

$$V2 = v\ \sin(\omega t)\sin(\theta_E + 120) \quad (4)$$

$$V3 = v\ \sin(\omega t)\sin(\theta_E + 240) \quad (5)$$

where $\omega$ is the drive circuit frequency, $\theta_E$ is the shaft angle in electrical degrees within any 60 mechanical degree segment, t is time. The equations represent the value of the voltage present across the associated coil. The voltage V1 is the voltage across the coil 86a, and V2 and V3 are the voltages across the coils 86b and 86c, respectively.

The output of each receiving coil 86a, 86b, 86c goes through six cycles (360 electrical degrees) for each 360 mechanical degrees of relative rotation between the transmitting ring 56 and the receiving ring 58, or, equivalently, between the rotor and the stator. If the output of each receiving coil were to be observed, the output voltage amplitudes would follow a sine wave pattern and end at its starting terminal each 1/6th of a complete mechanical revolution between the stator and the rotor. Therefore, the voltage at the output of each receiving coil goes through 360 electrical degrees for each 60 degrees of mechanical rotation between the rotor and the stator.

The equations for V1, V2, and V3 provide three equations with three unknowns. As the transmitting ring 56 rotates relative to the receiving ring 58, such as occurs when the rotor moves relative to the stator, the values output from the three receiving coils vary.

Controller 140 has a drive control circuit 150 which monitors the values output by each of the receiving coils 84. At any instant in time t, the drive control circuit 150 can measure the value of the voltage present at the outputs of the receiving coils and solve the equations for $\theta_E$. The solution of the equations for $\theta_E$ represents the rotary position, in electrical degrees, of the motor rotor relative to the stator within any 60 mechanical degree segment. Knowing the position of the rotor relative to the stator permits the drive control circuit 150 to control commutation of the motor 26. The output of motor position sensor 54 is connected to drive control circuit 150 and turn signal control function 130 in controller 140.

Referring to FIG. 1, a position sensor 103 is operatively connected across the input shaft 16 and the pinion shaft 17 and provides an electrical signal having a value indicative of the relative rotational position between the input shaft and the pinion shaft. The position sensor 103 in combination with the torsion bar 18 form a torque sensor 110. The output of the position sensor is indicative of the applied steering torque to the vehicle steering wheel 12 by the vehicle operator. The output of the torque sensor 110 is connected to the controller 140 including a torque command and direction circuit 111 that provides a desired torque value as a function of applied steering torque measured by the torque sensor 110. This functional relationship may be any one of several possible relationships with the goal of improving steering feel. One functional relationship between the output of 111 and the input of applied steering torque is a "smile" curve. Other relationships include those disclosed in U.S. pending patent applications to McLaughlin Ser. No. 246,947 filed May 20, 1994 and U.S. patent application to McLaughlin et al. Ser. No. 212,112 filed Mar. 11, 1994, both of which are hereby fully incorporated herein by reference.

Torque command circuit 111 provides input signals to drive control circuit 150. The output of motor position sensor 54 is connected to drive control circuit 150. Based upon the torque command signal and the position of the motor, the drive control circuit 150 provides a motor control signal used to control energization of the electric assist motor 26 in terms of sequence and current applied to the stator coils through a plurality of power switches 112. Drive control circuit 150 is preferably a microcomputer.

Figure 9:
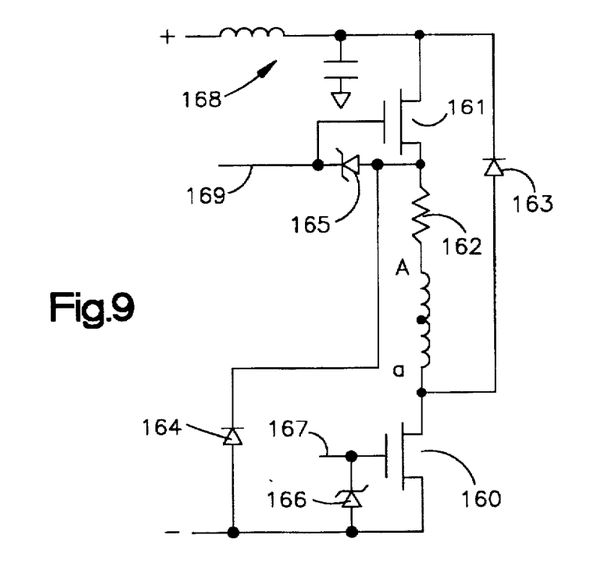
FIG. 9 is a schematic circuit diagram of the power switch shown in FIG. 1.

Referring to FIG. 9, a typical drive circuit is shown for a pair of the stator coils Aa. Each of the other motor phases have similar drive circuits. The first drive switch 160 is operatively connected between one side of the stator coil and electrical ground. A second drive switch 161 is connected to the other side of the coil pair Aa through a current sense resistor 162. The other side of the switch 161 is connected to the vehicle battery through an LC filter network 168. A first fly-back diode 163 is connected between one terminal of the motor and the LC filter 168. A second fly-back diode 164 is connected between ground and the switch 161. An over-voltage protection Zener diode 165 is connected across switch 161. An over-voltage protection Zener diode 166 is connected across switch 160. Preferably, switches 160, 161 are solid state switches such as field-effect-transistors ("FET's"). Current control is accomplished by the drive control circuit 150 pulse-width-modulating ("PWM") the switches 160, 161 on control lines 167, 169.

Figure 10:
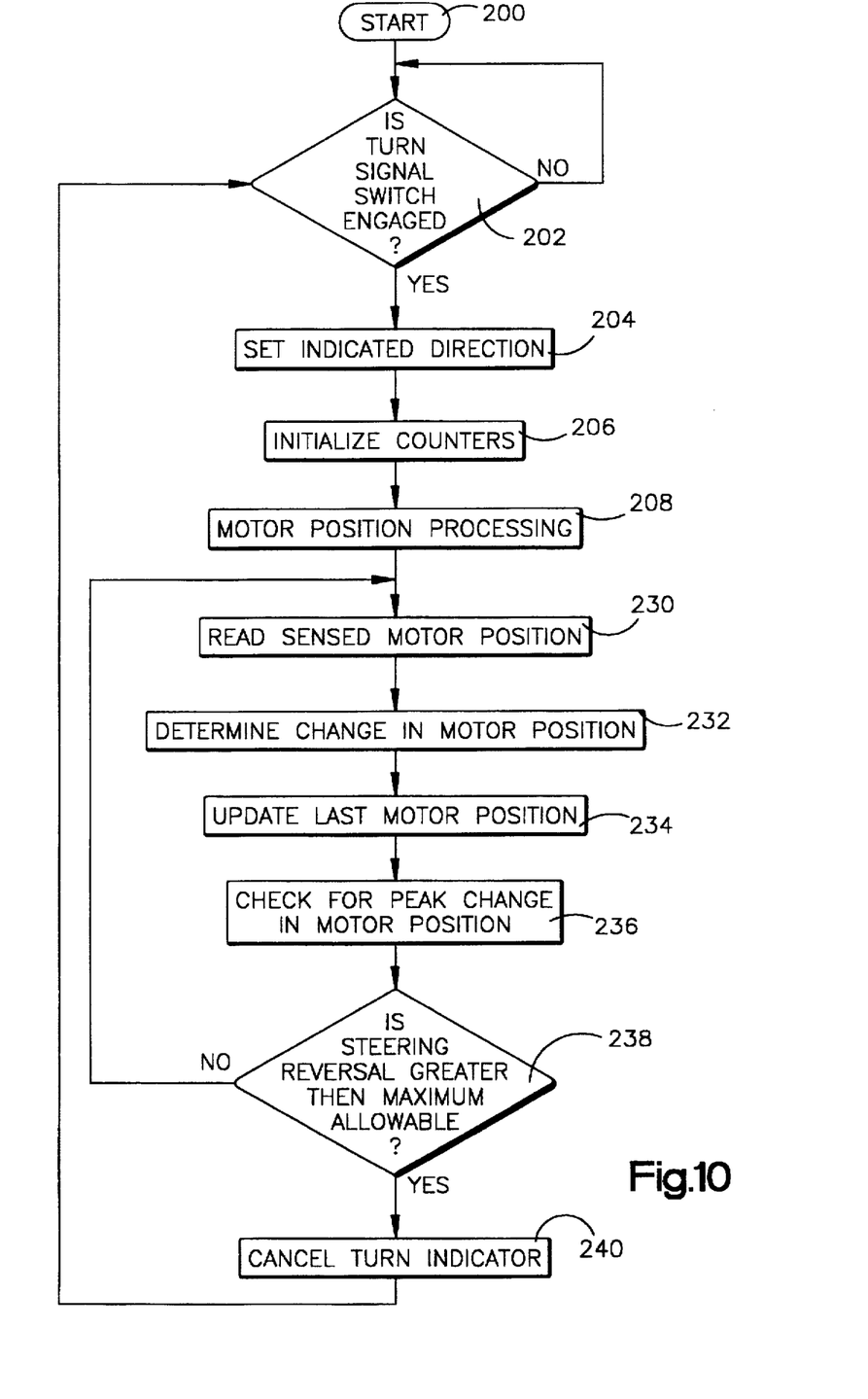
FIG. 10 is a flow chart illustrating the process steps followed by the apparatus of FIG. 1.

Referring to FIG. 10, the control process for electronic cancellation of a vehicle directional signal in turn signal control function 130 of the present invention will be better appreciated. The procedure starts in step 200 where the control process is initialized by controller 140. In step 200, internal memories of the controller are reset, internal timers reset, etc., as is well known in the art. The process then proceeds to step 202.

In step 202, a determination is made as to whether turn signal selection switch 13 has been actuated. If the determination is negative, indicating selector switch 13 has not been actuated, the process returns to step 202. If the determination is affirmative, indicating that turn signal selection switch has been actuated, the process proceeds to step 204 where the indicated direction is set.

In step 204, a flag is set to indicate the direction selected by the vehicle operator. When a right turn is indicated by selector switch 13, a flag (SF) is set at a value of +1. When a left turn is indicated, the flag (SF) is set to a value of −1.

In step 206, motor position counters are set to an initial zero value. The motor position counters monitor a total motor position ($MP_{TOT}$) and a peak motor position (PMP). $MP_{TOT}$ represents net total accumulated incremental change in motor position. PMP represents the largest value of $MP_{TOT}$ stored prior to reversal of the turning direction. The process then proceeds to step 208.

Figure 11:
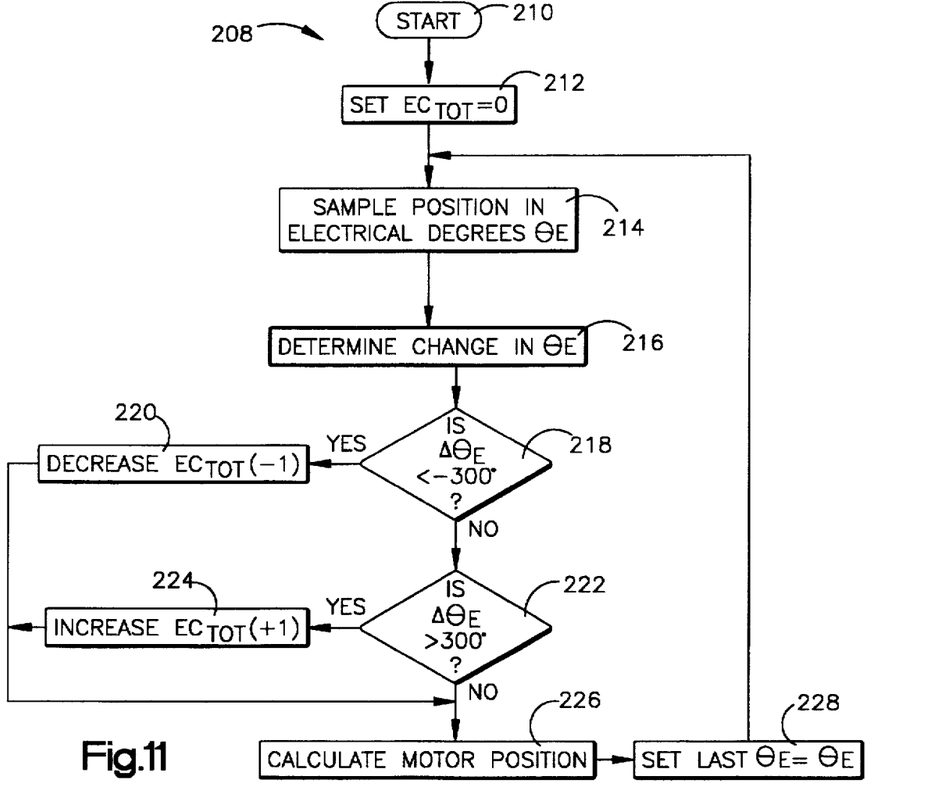
FIG. 11 is a flow chart illustrating a portion of the control process illustrated in FIG. 10 in further detail.

Motor position processing occurs in step 208. Referring to FIG. 11, the control process of step 208 will be better appreciated. In step 210, the process begins. Next, in step 212, an electrical cycle total ($EC_{TOT}$) value is set equal to zero. $EC_{TOT}$ represents the cumulative net total of electrical cycle transitions counted using motor position sensor 54. $EC_{TOT}$ is updated each time the change in sensed rotor position satisfies the conditions indicating the rotor has passed through a positive or negative electrical cycle transition. As described above, there are six electrical cycles for each full mechanical revolution of the motor 26.

In step 214, the electrical degree position ($\theta_E$) of sensor 54 is sampled. The sampling rate is such that the change in $\theta_E$ between samples is small relative to one electrical cycle. A value indicating the position, in electrical degrees within one electrical cycle, for $\theta_E$ is determined as described above using equations (3), (4), and (5).

Next, in step 216, the change in electrical degree position ($\Delta\theta_E$) is determined using the following equation:

$$\Delta\theta_E = L\theta_E - \theta_E \qquad (6)$$

where $\theta_E$ is the most recently sampled position value in electrical degrees, and $L\theta_E$ is the last sampled value of $\theta_E$ that was determined and stored during the previous sampling cycle. The first time through the control process of step 208, for each actuation of turn selector switch 13, the initial value of $L\theta_E$ is set equal to $\theta_E$. The process then proceeds to step 218.

In step 218, a determination is made as to whether an electrical cycle transition in a negative direction has occurred. An electrical cycle transition in the negative direction is considered to have occurred when $\Delta\theta_E$ is less than minus three-hundred (−300) electrical degrees. A negative direction corresponds to counter clockwise handwheel rotation, i.e., a left turn. Three hundred electrical degrees is selected to indicate a cycle transition point since it is more convenient to work with in the calculations than 360° (electrical). If the determination in step 218 is negative, i.e. $\Delta\theta_E$ is not less than minus three-hundred (−300) electrical degrees, the process proceeds to step 222.

In step 222, a determination is made as to whether an electrical cycle transition in a positive direction has occurred. An electrical cycle transition in the positive direction is considered to have occurred when $\Delta\theta_E$ is greater than three-hundred electrical degrees. A positive direction corresponds to clockwise handwheel rotation, i.e., a right hand turn. If the determination in step 222 is negative, i.e. $\Delta\theta_E$ is not greater than three-hundred electrical degrees, the process proceeds to step 226.

In step 226, motor position, in mechanical degrees of rotor rotation, is determined and expressed by the following equation:

$$MP = \frac{(EC_{TOT} \cdot 360 + \theta_E)}{6} \qquad (7)$$

where MP is motor position in cumulative mechanical degrees of rotation, $EC_{TOT}$ is the cumulative total of electrical cycle transitions, and $\theta_E$ is the most recent sampled position value, in electrical degrees.

Figure 12:
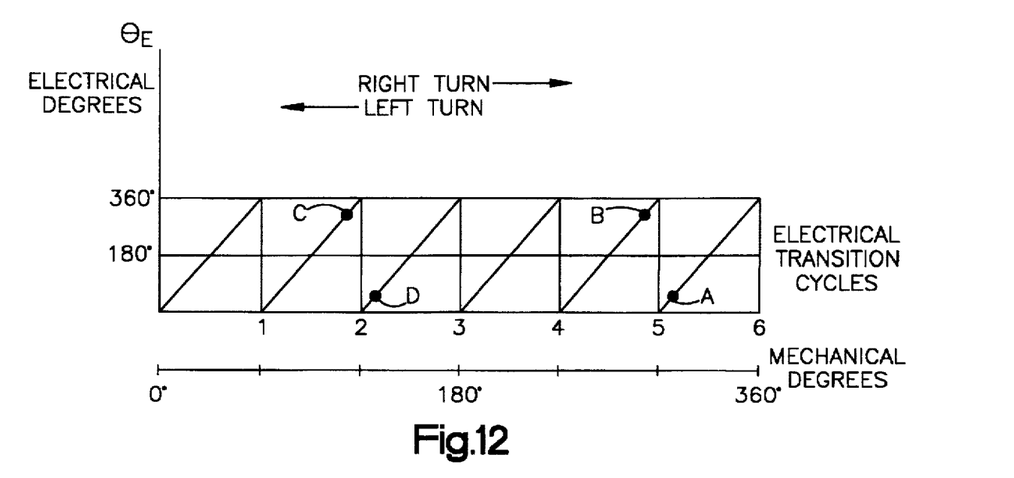
FIG. 12 is a graphical representation illustrating transition cycles for the control process shown in FIG. 11.

Referring to FIG. 12, point A is located to the right of the fifth electrical transition cycle. $EC_{TOT}$ has a value of 5 and point A corresponds to a $L\theta_E = 2°$ electrical in the sixth electrical transition cycle. Using equation (7) the motor position in mechanical degrees is:

$$MP = \frac{(5 \cdot 360) + 2}{6} = \frac{1800 + 2}{6} = 300.3° \text{ mechanical} \qquad (8)$$

The value of MP is provided to step 230 in the control process shown in FIG. 10. The process of FIG. 11 then proceeds to step 228.

Next, in step 228, the last electrical degree position ($L\theta_E$) is updated to equal the most recent sampled electrical degree position $\theta_E$. The process returns to step 214 and repeats. It will be appreciated that the process may continuously provide motor position values and not be dependant upon the actuation of selector switch 13.

If the determination in step 218 is affirmative, i.e. $\Delta\theta_E$ is less than minus three-hundred (−300) electrical degrees, the process proceeds to step 220 where $EC_{TOT}$ is decreased by one.

Referring to FIG. 12, the updating process of steps 218 and 220 will be appreciated. Point A is located to the right of the fifth electrical transition cycle. Assume $EC_{TOT}$ has a value of 5 and point A corresponds to $L\theta_E = 2°$ (electrical degrees) in the sixth electrical transition cycle. The direction of rotation of the vehicle handwheel is counter clockwise toward point B, located to the left of the fifth transition cycle at a $\theta_E = 358°$ (electrical degrees), in the fifth electrical transition cycle. Using equation (6) above;

$$\Delta\theta_E = 2° - 358° = -356° \qquad (9)$$

Since −356° (electrical) is less than −300° (electrical), the determination in step 218 is affirmative. The process proceeds to step 220 where $EC_{TOT}$ is decreased by one to a value of 4. The process then proceeds to step 226 described above.

If the determination in step 222 is affirmative, i.e. $\Delta\theta_E$ is greater than three-hundred electrical degrees, the process proceeds to step 224 where $EC_{TOT}$ is increased by one. Referring to FIG. 12, the updating process of steps 222 and 224 will be appreciated. Point C is located to the left of the second electrical transition cycle. Assume $EC_{TOT}$ has a value of 1 and point C corresponds to a $L\theta_E = 355°$ (electrical) in the second electrical transition cycle. The direction of rotation of the vehicle handwheel is clockwise toward point D, located to the right of the second transition cycle at a $\theta_E = 4°$ (electrical), in the third electrical transition cycle. Using equation (6) above;

$$\Delta\theta_E = 355° - 4° = 351° \qquad (10)$$

Since 351° (electrical) is greater than 300° (electrical), the determination in step 222 is affirmative. The process proceeds to step 224 where $EC_{TOT}$ is increased by one to a value of 2. The process then proceeds to step 226 described above.

Referring to FIG. 10, the motor position in mechanical degrees (MP) from step 208 is provided to step 230. In step 230, the most recent motor position (MP) is sampled and the initial value for last motor position (LMP) is set. The first time through the control process of step 230, for each actuation of turn selector switch 13, the initial value of the last motor position sampled (LMP) is set equal to MP. The process then proceeds to step 232.

In step 232, motor position total ($MP_{TOT}$) is determined and expressed in the following equation:

$$MP_{TOT} = MP_{TOT} + (MP - LMP) \cdot SF \qquad (11)$$

where $MP_{TOT}$ is the cumulative net total of previous incremental samples, MP is the most recent sample of motor position from step 208, LMP is the last motor position sampled during the previous sample cycle, and SF is the flag value set as described above.

The set flag value makes the value of $MP_{TOT}$ positive if the turn motion is in the same direction as the indicated direction set in step 204. The process then proceeds to step 234 where the value of LMP is made equal to the current value of MP for the next sample cycle.

In step 236, a determination is made as to whether a peak motor position (PMP) has been reached. If the most recent value $MP_{TOT}$ is greater than the current value of PMP, the value of PMP is set equal to the most recent value of $MP_{TOT}$. Once the most recent value of $MP_{TOT}$ begins decreasing, and is less than the current value of PMP, the value of PMP remains at the peak value of $MP_{TOT}$. The process then proceeds to step 238.

In step 238, a determination is made as to whether motor position total ($MP_{TOT}$) is less than the peak motor position (PMP) minus the maximum allowable reversal (MR) in motor rotation. Maximum allowable reversal is the amount of return rotation of the steering system required to cancel the turn indicator. In the preferred embodiment, maximum allowable reversal corresponds to a return rotation of the steering wheel 12 equal to 15°. Due to rack and pinion gear ratios, the 15° steering wheel return results in approximately 93° (mechanical) of rotation by motor 26 for maximum allowable rotation of the motor. It will be appreciated that the maximum allowable reversal values and ratios are vehicle platform dependant and the values may vary from vehicle to vehicle.

If the determination in step 238 is affirmative, indicating that $MP_{TOT}$ is less than PMP minus MR, the process proceeds to step 240 where the turn indicator is cancelled. The process then returns to step 202. If the determination in step 238 is negative, i.e. $MP_{TOT}$ is not less than PMP minus MR, the process returns to step 230.

From the above description of preferred embodiments of the invention, those skilled in the art will perceive improvements, changes and modifications. Such improvements, changes and modifications within the skill of the art are intended to be covered by the appended claims.

Having described a preferred embodiment of the invention, the following is claimed:

1. An electronically cancelling directional signal for use in a vehicle, comprising:

turn signal selection means for providing a signal indicative of a selected turning direction;

turn signal indicating means for indicating a selected turning direction;

an electric assist motor for, when energized, providing power assist steering;

motor position sensing means for sensing a motor position and for providing a motor position signal indicative thereof; and control means connected to said turn signal selection means, to said turn signal indicating means, and to said motor position sensing means for actuating said turn signal indicating means in response to said turn signal selection means indicating a selected turning direction and for controlling cancellation of said turn signal indicating means in response to said sensed motor position indicating a motor reversal.

2. The electronically cancelling directional signal system of claim 1 wherein said electric assist motor is a variable reluctance motor.

3. The electronically cancelling directional signal system of claim 2 wherein said motor position sensing means is a rotary position sensor.

4. A method for cancelling a directional signal for a vehicle, comprising the steps of:

selecting a turn signal direction and providing a signal indicative of the selected turning direction;

providing an electric assist motor for, when energized, providing power assist steering;

sensing position of said motor and providing a motor position signal indicative thereof; and controlling said turn signal indication in response to said motor position signal so as to cancel said signal indicative of a selected turning direction when said sensed motor position indicates a motor reversal.

5. An electronically cancelling directional signal for use in a vehicle, comprising:

turn signal selection means for providing a signal indicative of a selected turning direction;

turn signal indicating means for indicating a selected turning direction;

an electric assist motor for, when energized, providing power assist steering;

motor position sensing means for sensing a motor position and for providing a motor position signal indicative thereof; and control means connected to said turn signal selection means, to said turn signal indicating means, and to said motor position sensing means for actuating said turn signal indicating means in response to said turn signal selection means indicating a selected turning direction and for controlling cancellation of said turn signal indicating means in response to said sensed motor position indicating a motor reversal and motor movement of a predetermined amount.

6. A method for cancelling a directional signal for a vehicle, comprising the steps of:

selecting a turn signal direction and providing a signal indicative of the selected turning direction;

providing an electric assist motor for, when energized, providing power assist steering;

sensing position of said motor and providing a motor position signal indicative thereof; and controlling said turn signal indication in response to said motor position signal so as to cancel said signal indicative of a selected turning direction when said sensed motor position indicates a motor reversal and motor movement of a predetermined amount.

* * * * *